United States Patent [19]

Fukushima

[11] 4,389,098
[45] Jun. 21, 1983

[54] ZOOM LENS BARREL

[75] Inventor: Syousuke Fukushima, Hachioji, Japan

[73] Assignee: Konishiroku Photo Industry Co., Ltd., Tokyo, Japan

[21] Appl. No.: 181,615

[22] Filed: Aug. 26, 1980

[30] Foreign Application Priority Data

Aug. 29, 1979 [JP] Japan ............................. 54-117961[U]

[51] Int. Cl.³ ............................................... G02B 7/10
[52] U.S. Cl. ..................................................... 350/429
[58] Field of Search ......................................... 350/429

[56] References Cited

U.S. PATENT DOCUMENTS 3,090,282 5/1963 Angenieux ........................... 350/429
4,275,952 6/1981 Uesugi .................................. 350/429

Primary Examiner—John K. Corbin
Assistant Examiner—Rebecca D. Gass
Attorney, Agent, or Firm—Jordan B. Bierman; Linda Bierman

[57] ABSTRACT

In a zoom lens the fixed barrel is provided with one or more smooth outer surfaces on which are slidably supported an operating member supporting a first lens system and a driven member supporting a second lens system. A linear slot and a first oblique cam slot are formed in one or the other of the outer barrel surfaces and a second cam slot is formed in the operating member. The operating member slides in the linear slot, and pin means on the driven member engages the two cam slots. This mechanical arrangement permits movement of the lens systems frame a wide-angle to a telescopic position and vice versa. Since all sliding movement is on the outside of the barrel, applied lubricant does not fall inside the barrel and the inner surface of the barrel may be treated in any suitable manner to prevent internal reflections.

4 Claims, 5 Drawing Figures

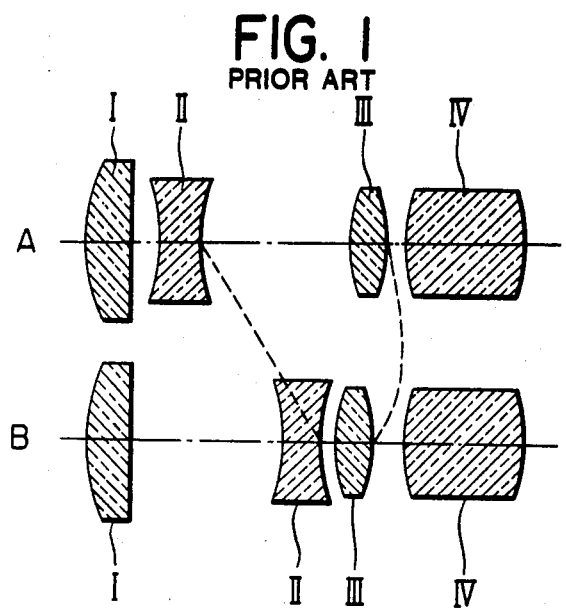
FIG. 1 PRIOR ART
FIG. 2
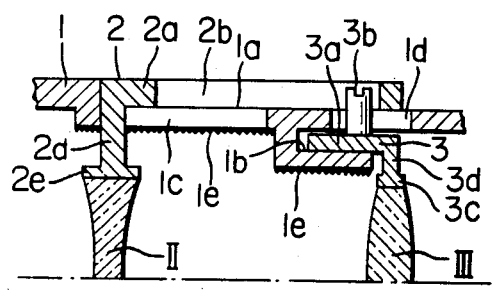
FIG. 3

ZOOM LENS BARREL

BACKGROUND OF THE INVENTION

The present invention relates to a zoom lens barrel having at least two or more groups of movable lens systems.

A conventional zoom lens barrel has a structure that uses a movable lens holding member whose outside diameter surface slidably moves in contact with the inside of the fixed barrel as will be shown by Japanese Laid-Open Patent Publication Nos. 55728/1973 and 137329/1977, and such movable lens holding member should have as much surface as necessary to be brought into contact with the fixed barrel, because otherwise a backlash will occur between them, leading to scattering of the lubricant applied to the sliding surfaces which, may then sometimes soil the inside of the barrel; since the inside sliding surface of the fixed barrel does not allow any antireflection treatment, such surface is apt to cause an inner surface reflection.

SUMMARY OF THE INVENTION

It is an object of the present invention to prevent the occurrence of such problems as stated above, and the present invention relates to a zoom lens barrel which comprises a fixed barrel provided with two or more smooth slidably fitting surfaces on the outer circumference of the barrel, at least one optical axial linear slot, and one or more cam slots obliquely intersecting the optical axis; an operational member whose operational ring portion has a cam slot which slidably connects with one of the smooth slidably fitting surfaces of the outer circumference on the fixed barrel, the operational ring being integrated with a lens frame by a slidably connecting member or portion projecting through the linear slot of the fixed barrel; and a driven member having a cam pin which engages the cam slot of the fixed barrel and the cam slot of the operational member and is positioned on the slidably fitting portion which slidably engages other slidably fitting surface of the outer circumference of the fixed barrel, the slidably fitting portion and the other lens frame being integrated with each other.

In the zoom lens barrel according to the present invention, either the operational member or the driven member, corresponding to a conventional movable lens holding member, is arranged so as to slidably connect with the smooth fitting surface of the outer circumference of the fixed barrel, so that no backlash will occur during sliding motion, and lubricant, even when applied, will hardly be scattered or fallen off, nor will the inside of the fixed barrel be subjected to friction, permitting it to be provided with an antireflection treatment, and thus resulting in an excellent effect to largely reduce any inner surface reflection of light.

The present invention will be more apparent from the detailed description of the preferred embodiments taken in conjunction with accompanying drawings.

BRIEF DESCRIPTION OF THE DRAWINGS

FIG. 1 is a side view diagrammatically showing the movement of a conventional zoom lens system.

FIG. 2 and FIG. 3 are respectively a partial sectional side view of and a plan view showing the principal portion of the zoom lens barrel as an embodiment of the present invention.

DETAILED DESCRIPTION OF THE PREFERRED EMBODIMENTS

Figure 4:
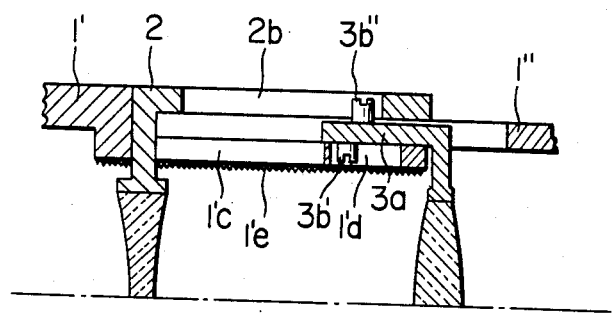
FIGS. 4 and 5 are respectively a partial side view of and a plan view showing the zoom lens barrel in another embodiment.

As a described above, FIG. 1 shows a typical arrangement of most common zoom lens systems in which I is a focussingobjective lens, II is a variator lens for varying its focal length, III is a compensator lens, and IV is a fixed lens. FIG. 1 (A) shows a zoom lens in the state of being wide-angle, i.e., of a short focal length, while (B) shows the same in the state of being telescopic, i.e., of a long focal length, and with the transition between these states, lenses II and III must be moved as shown by the broken lines in the drawings.

FIG. 2 is a partial sectional side view of the principal portion of the zoom lens barrel of the present invention, wherein such lenses II and III are thus moved, while FIG. 3 is a plan view of the barrel, wherein 1 is the fixed barrel, 2 is a operational member, and 3 is a driven member. Fixed barrel 1 is provided with an outer circumferential fitting surface 1a which slidably supports an operational ring 2a of the operational member 2, and with another outer circumferential fitting surface 1b which slidably supports fitting portion 3a of driven member 3, and also is provided an optical axial linear slot 1c and a cam slot 1d. Operational ring portion 2a of the operational member 2 provided with cam slot 2b is integrated with lens frame 2c of lens II and slidably connecting portion 2d which projects through the linear slot 1c of fixed barrel 1. Fitting portion 3a of driven member 3 supports thereon a cam pin 3b which engages cam slot 2b of operational member 2. The fitting portion 3a is integrated with lens frame 3c of lens III and connecting portion 3d.

As shown in the drawing, as the operational ring portion 2a of operational member 2 is drawn rightward by hand from the position where the focal length of the zoom lens is in the wide angle position, slidably connecting portion 2d of the operational member is guided through linear slot 1c of fixed barrel 1 to permit operational member 2 to move to the position shown with a dash-and-dot line (FIG. 3) and to the position shown with an imaginary line or dash-and-two dots line, whereby the position of cam slot 2b of operational member 2 also moves, as shown by FIG. 3, from the position with a dash-and-dot line to the position with an imaginary line or dash-and-two dots line (no reference symbol), so that the cam slot 2b and cam pin 3b of driven member 3 engaged with cam slot 1d of fixed barrel 1 are moved so as to reciprocate within cam slot 1d of fixed barrel 1, thereby causing lenses II and III to move, as shown with the dotted lines, from their positions shown in A to those in B of FIG. 1. When operational member 2 is moved leftward from the right, lenses II and III, following the transition reverse to the above case, the focal length of the zoom lens is changed from the telescopic state to the wide angle position.

As has been mentioned, since both operational member 2 and driven member 3, which are movable lens holding members, slidably contacts the outer circumferential fitting surfaces 1a and 1b of fixed barrel 1, inside surfaces 1e of the fixed barrel 1 are not subjected to any friction, thus permitting application to the entire inside surface area 1e of shading grooves with darkening treatment or of other antireflection means such as a woolly or velvet-like material, as shown in FIG. 2.

Further, with respect to the movement mechanism for the focussing of focussing objective lens I in FIG. 1, though not shown, any conventionally known mechanism is applicable. In the present invention, the addition of another driven member which moves otherwise then the driven member 3 shown in FIG. 2 will also be readily attainable by providing fixed barrel 1 with outside diameter fitting surfaces and a cam slot therefor.

Figure 5:
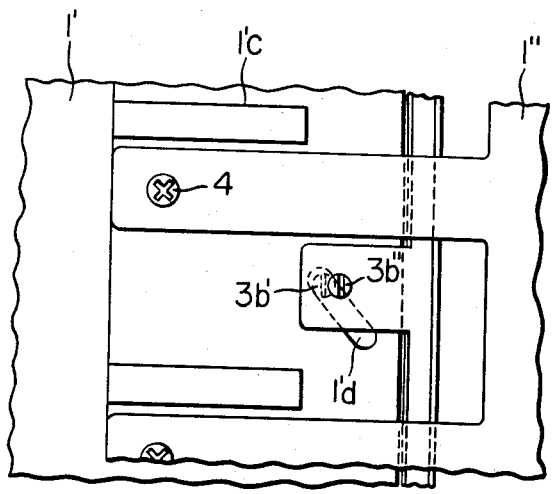

In the zoom lens barrel of the present invention in FIGS. 4 and 5, fixed barrel 1 is composed of front portion 1' and rear portion 1" connected with one another, and fitting portion 3a of driven member 3 is supported thereon with two cam pins 3b' and 3b". Cam pin 3b' is engaged with a cam slot 1'd of front portion 1' of the fixed barrel 1, and the other cam pin 3b" is engaged with cam slot 2b of operational member 2. In addition, 1'c and 1'e are respectively a linear slot and an inner surface of the fixed barrel which being treated for preventing light reflection, and 4 is an fastening screw for combining the front portion 1' and the rear portion 1" of the fixed barrel 1. Such combining manner for fixed barrel 1 enables not only the easier fabrication of the fixed barrel but also a more compact zoom lens barrel.

What is claimed is:

1. In a zoom lens having at least two movable lenses, the combination of a fixed barrel having at least two outwardly positioned smooth supporting surfaces, means forming an optically axial linear slot and a first cam slot oblique to the optical axis in one of said surfaces, an operating member having a second cam slot therein slidably mounted in said linear slot on one of said smooth supporting surfaces, a first lens system supported from said operating member, a driven member slidably supported on one of said smooth supporting surfaces, a second lens system supported from said driven member, and pin means mounted on said driven member and extending vertically therefrom into said first and second cam slots, whereby movement of said operating member in said linear slot causes sliding movement of said operating member and said driven member on the said outer surfaces of said barrel and axial movement of said two lens system relatively to one another.

2. In a zoom lens according to claim 1 in which said operating member is slidably mounted on the smooth supporting surface having said linear slot and said first cam slot, and said driven member is slidably mounted on the other smooth supporting surface, and in which said pin means comprises a pin extending outwardly of said driven member into said first and second cam slots 3. In a zoom lens according to claim 1, in which said driven member is slidably mounted on the smooth supporting surface having said linear slot and said first cam slot, and said operating member is slidably mounted on said other smooth supporting surface, and in which said pin means comprises a first pin extending outwardly of said driven member into said second cam slot and a second pin extending outwardly of said driven member into said first cam slot.

4. In a zoom lens according to claims 1, 2 or 3 in combination with antireflection means provided on the inner surfaces of said fixed barrel.

* * * * *